United States Patent
Guglielmone et al.

(10) Patent No.: US 8,898,032 B2
(45) Date of Patent: Nov. 25, 2014

(54) METHOD FOR ESTIMATING AN EXHAUST GAS TEMPERATURE

(75) Inventors: Federico Luigi Guglielmone, Rivoli (IT); Luca Giuseppe Pairolero, Cascine Vica Rivoli (IT)

(73) Assignee: GM Global Technology Operations LLC, Detroit, MI (US)

( * ) Notice: Subject to any disclaimer, the term of this patent is extended or adjusted under 35 U.S.C. 154(b) by 550 days.

(21) Appl. No.: 13/233,795

(22) Filed: Sep. 15, 2011

(65) Prior Publication Data
US 2012/0072162 A1 Mar. 22, 2012

(51) Int. Cl.
*G01K 5/00* (2006.01)
*F01N 11/00* (2006.01)
*F02D 41/14* (2006.01)

(52) U.S. Cl.
CPC ....... *F01N 11/002* (2013.01); *F01N 2900/1404* (2013.01); *F02D 41/1463* (2013.01); *F02D 41/1447* (2013.01); *F01N 2560/026* (2013.01); *F02D 41/1494* (2013.01); *Y02T 10/47* (2013.01)
USPC .......................................................... 702/130

(58) Field of Classification Search
CPC .......... G06F 1/206; G01K 7/42; G01K 15/00; F01N 11/002; F02D 41/1447; F02D 41/1463; F02D 41/1494
See application file for complete search history.

(56) References Cited

U.S. PATENT DOCUMENTS

| | | | |
|---|---|---|---|
| 6,422,000 B1 | 7/2002 | Poggio et al. | |
| 7,467,628 B2 | 12/2008 | Adams et al. | |
| 7,726,290 B2 | 6/2010 | Arlt et al. | |
| 2008/0178856 A1* | 7/2008 | Adams et al. | 123/697 |
| 2009/0038595 A1* | 2/2009 | Arlt et al. | 123/676 |
| 2011/0202230 A1* | 8/2011 | Sawada et al. | 701/34 |

FOREIGN PATENT DOCUMENTS

| | | |
|---|---|---|
| DE | 4339692 A1 | 5/1995 |
| DE | 102006009241 A1 | 9/2007 |
| EP | 1091108 A1 | 4/2001 |
| FR | 2771815 A1 | 6/1999 |

OTHER PUBLICATIONS

German Patent Office, German Search Report for Application No. 102011113168.3, dated Feb. 22, 2012.

* cited by examiner

*Primary Examiner* — Elias Desta
(74) *Attorney, Agent, or Firm* — Ingrassia Fisher & Lorenz, P.C.

(57) ABSTRACT

A Method is provided for estimating a temperature of an exhaust gas in an exhaust line of an internal combustion engine. The exhaust line is provided with a $NO_x$ sensor that includes, but is not limited to a heater. The method includes, but is not limited to determining a value of a parameter indicative of a heat released by the heater of the $NO_x$ sensor, and of calculating a value of the temperature of the exhaust gas as a function of the determined value of this parameter.

12 Claims, 4 Drawing Sheets

METHOD FOR ESTIMATING AN EXHAUST GAS TEMPERATURE

TECHNICAL FIELD

The technical field relates to a method for estimating a temperature of an exhaust gas which flows in an exhaust line of an internal combustion engine, typically an internal combustion engine of a motor vehicle. This temperature can then be used for controlling the composition of exhaust gases of such vehicles and in particular for reducing the amount of nitrogen oxides in these exhaust gases.

BACKGROUND

An internal combustion engine is conventionally equipped with an exhaust line, for leading the exhaust gas from the engine to the environment, and with a plurality of after treatment devices located in the exhaust line, for degrading and/or removing pollutants from the exhaust gas. More particularly, the after treatment devices of a Diesel engine usually comprise a Diesel Oxidation Catalyst (DOC), for oxidizing hydrocarbon (HC) and carbon monoxides (CO) into carbon dioxide ($CO_2$) and water ($H_2O$), and a Diesel Particulate Filter (DPF), located in the exhaust line downstream the DOC, for removing diesel particulate matter or soot from the exhaust gas.

In order to reduce $NO_x$ emissions, most Diesel engine further comprise an SCR catalyst, which is located in the exhaust line downstream the DPF, in order to promote a Selective Catalytic Reduction (SCR) of the nitrogen oxides ($NO_x$) contained in the exhaust gas. As a matter of fact, the SCR catalyst is a catalytic device in which the nitrogen oxides ($NO_x$) contained in the exhaust gas are converted into diatomic nitrogen ($N_2$) and water ($H_2O$), with the aid of a gaseous reducing agent, typically ammonia ($NH_3$), which is stored inside the catalyst. The ammonia is obtained through thermo-hydrolysis of a Diesel Exhaust Fluid (DEF), typically urea ($CH_4N_2O$) that is injected into the exhaust line by means of a dedicated injector located between the DPF and the SCR catalyst.

The DEF injector is controlled by an engine control unit (ECU), which regulates the DEF quantity to be injected, such as to obtain a satisfactory $NO_x$ conversion rate inside the SCR catalyst. As a matter of fact, the ECU determines the DEF quantity to be injected with a control procedure which generally requires for determining many physical parameters of the exhaust gas flowing in the exhaust line, such as for example the exhaust gas temperature upstream the SCR catalyst, the exhaust gas temperature downstream the SCR catalyst, the concentration of $NO_x$ upstream the SCR catalyst and the $NO_x$ concentration downstream the SCR catalyst.

Conventionally, these parameters are measured by means of dedicated sensors connected to the ECU, including a first temperature sensor located in the exhaust line between the DPF and the SCR catalyst, a second temperature sensor located in the exhaust line downstream the SCR catalyst, a first $NO_x$ sensor located in the exhaust line between the DPF and the SCR catalyst, and a second $NO_x$ sensor located in the exhaust line downstream the SCR catalyst. A drawback of this solution is that the use of so many sensors complicates the architecture of the exhaust line and increases the cost of the same.

In view of the foregoing, it is at least one object to reduce the number of sensors in an internal combustion engine, thereby solving, or at least positively reducing, the above mentioned drawback. At least another object is to reduce the number of sensors involved in the control procedure of the SCR catalyst, as well as in any other control procedure which requires for determining both the temperature and the $NO_x$ content of the exhaust gas. In addition, other objects, desirable features and characteristics will become apparent from the subsequent summary and detailed description, and the appended claims, taken in conjunction with the accompanying drawings and this background.

SUMMARY

An embodiment provides an apparatus for estimating a temperature of an exhaust gas in an exhaust line of an internal combustion engine. The exhaust line is provided with a $NO_x$ sensor comprising a heater. The apparatus comprises means for determining a value of a parameter indicative of a heat released by the heater of the $NO_x$ sensor, and means for calculating a value of the temperature of the exhaust gas as a function of the determined value of this parameter.

Another embodiment provides a method for estimating a temperature of an exhaust gas in an exhaust line of an internal combustion engine, wherein the exhaust line is provided with a $NO_x$ sensor comprising a heater. This is a method which may be carried out when the above-mentioned apparatus is in operation and it performs the steps of: determining a value of a parameter indicative of an heat released by the heater of the $NO_x$ sensor, and calculating a value of the temperature of the exhaust gas as a function of the determined value of this parameter.

These embodiments are based on the following considerations. Most $NO_x$ sensors comprise a sensing element which is able to guarantee an accurate and stable output signal, only if it is heated to a target operating temperature (about approximately 800° C.) and if this operating temperature is kept constant. The sensing element is partially heated by the exhaust gas passing through the exhaust line, but the temperature of the exhaust gas, especially in the Diesel engines, is generally insufficient for raising the temperature of the sensing element up to the target operating temperature. Moreover, the temperature of the exhaust gas is usually subjected to strong fluctuations, which do not allow keeping the operating temperature of the sensing element constant.

For these reasons, these $NO_x$ sensors further comprise a dedicated heater (resistor), which heats the sensing element to make up for the insufficient exhaust gas temperature and for the exhaust gas temperature fluctuations. This heater is supplied with a pulse width modulation (PWM) electrical signal, whose amplitude depends on the voltage generated by an electrical battery connected to the heater. The heater is controlled by the ECU, which uses feedback data coming from the $NO_x$ sensor to determine the deviation between the target operating temperature and the actual temperature of the sensing element, and then regulates the duty cycle of the PWM electrical signal, so that the heater generates the quantity of heat necessary to compensate the determined deviation and to maintain the sensing element at the target operating temperature. Since this quantity of heat generally depends on the heating already achieved by the exhaust gas, it is possible to reliably estimate the exhaust gas temperature in a region close to the $NO_x$ sensor, using a parameter representative of the heat released by the heater of the $NO_x$ sensor.

The exhaust gas temperature can then be used for controlling the operation of the engine, in particular for controlling the injection of a gaseous reducing agent such as ammonia into the exhaust line as described above for reducing the amount of nitrogen oxides in the exhaust gases. In the latter case an ammonia injection can be carried out without dedicated temperature sensors as described above.

The embodiment described above allows employing a single device, namely the $NO_x$ sensor, for determining both the $NO_x$ content and the temperature of the exhaust gas, thereby simplifying the architecture of the exhaust line and reducing its manufacturing cost. According to an embodiment, the above mentioned parameter can be an electrical power supplied to the heater of the $NO_x$ sensor. Indeed, the electrical power supplied to the heater is strictly correlated to the heat released by the same heater, and it has also the advantage of being directly available for the ECU controlling the $NO_x$ sensor.

According to another embodiment, the value of the electrical power supplied to the heater of the $NO_x$ sensor can be calculated according to the following equation:

$$P_{el} = dc \cdot \frac{V_{batt}^2}{R_H}$$

Where: $P_{el}$ is the value of the electrical power supplied to the heater of the $NO_x$ sensor, $V_{batt}$ is a value of the voltage supplied by the electrical battery connected to the heater of the $NO_x$ sensor, dc is the duty cycle of the PWM electrical signal generated by means of this electrical battery and supplied to the heater of the $NO_x$ sensor, and $R_H$ is a value of the electrical resistance of the heater of the $NO_x$ sensor. The above mentioned values are generally available for the ECU controlling the $NO_x$ sensor, which is thus advantageously able to calculate the electrical power supplied to the heater in a very simple way.

According to still another embodiment, the value of the exhaust gas temperature can be calculated with the following equation:

$$T_{exh} = T_s - R_s \cdot P_{el}$$

Where: $T_{exh}$ is the value of the exhaust gas temperature, $P_{el}$ is the value of the electrical power supplied to the heater of the $NO_x$ sensor, $T_s$ is a value of the target operating temperature of the $NO_x$ sensor, and $R_s$ is a value of a conversion parameter correlating the supplied electrical power to a temperature of the $NO_x$ sensor: essentially an equivalent thermal resistance.

This solution has the advantage of calculating the exhaust gas temperature with a low computational effort. According to this solution, the value $R_s$ of the conversion parameter can be determined on the basis of a value of an exhaust gas flow rate in the exhaust line. Indeed, the higher is the flow rate of the exhaust gas, the higher is the capability of the exhaust gas to cool the sensing element of the $NO_x$ sensor, and the higher is also the electrical power supplied to the heater for a same temperature of the exhaust gas. As a consequence, determining the value $R_s$ of the conversion parameter as a function of the value of the exhaust gas flow rate, it is advantageously possible to calculate a more reliable value of the exhaust gas temperature.

According to another embodiment, the method provides for performing a dynamic correction of the calculated value of the exhaust gas temperature. The dynamic correction is generally defined as a mathematical correction procedure suitable for eliminating, or at least for positively reducing, the dynamic errors to which a measurement system is generally subjected. A dynamic error of a measurement system is the systematic deviation between the input and the output of the measurement system caused by the time delay with which the measurement system reacts to a variation of the input.

In the present case, the dynamic correction advantageously allows to remedy the dynamic errors caused by the delay with which the exhaust gas heats the sensing element of the $NO_x$ sensor, due to the thermal capacitance of the sensing element. Indeed, a variation of exhaust gas temperature is generally sensed by the sensing element of the $NO_x$ sensor with a certain delay, due to heat transfer function across the sensor wall.

The apparatus for carrying out the method may be an electronic control unit governing the functioning of the internal combustion engine. The apparatus has a determination means and a calculation means which may be a microprocessor, which works in cooperation with a random access memory (RAM) and with a computer readable medium, in particular a flash memory, for storing a computer program, whereby these electronic components can be integrated into a single unit such as a microcontroller or a so-called "system on chip" (SoC).

After manufacturing the hardware of the apparatus, e.g. the ECU, the computer program will be transferred to it from an external computer, a job which is normally done by a programming robot. The external computer may read the computer program from a CD or DVD, and transfers the data to the apparatus, a process commonly called in-system programming. Data transfer to the apparatus can be accomplished by wire or, if the apparatus has an associated receiver, in a wireless fashion by sending an electromagnetic wave which is modulated to carry a sequence of data bits representing the computer program.

The apparatus is switched on when the associated vehicle housing the internal combustion engine is started. In operation, the computer program is loaded into the RAM and the microprocessor carries out the instructions given by the machine code of the computer program. As a result, the apparatus carries out all the steps of the method described above, whereby each step of the method corresponds to a sequence of instructions given by the associated machine code of that computer program.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 4:
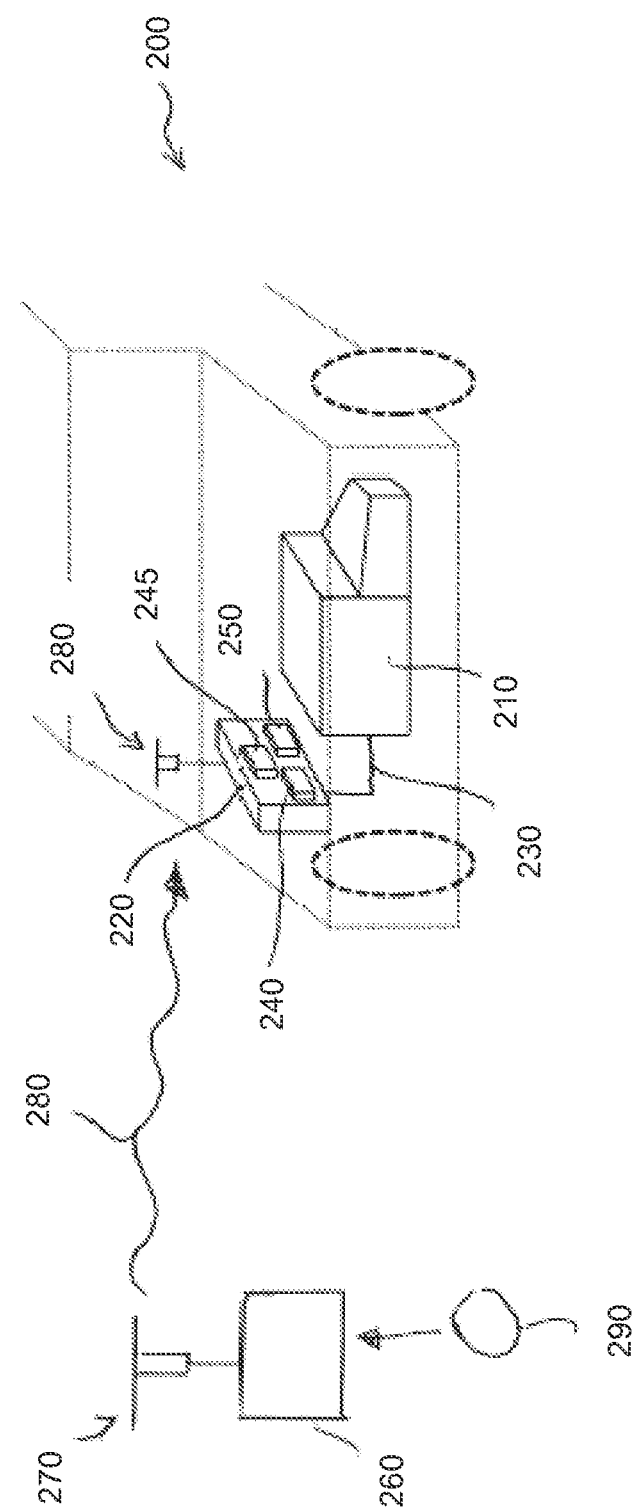
FIG. 4 shows a vehicle with an internal combustion engine.

FIG. 4 shows a motor vehicle 200 with an internal combustion engine 210 and an electronic control unit (ECU) 220. ECU 220 controls the operation of said internal combustion engine 210 via data line 230. The ECU comprises a microprocessor 240, a random access memory 245 and a computer readable medium 250 for storing a computer program. A computer program is stored on a computer readable medium 290, a CD or DVD, which is inputted in a well-known manner into a programming robot 260 having an antenna 270. Programming robot 260 then transmits the computer program via an electromagnetic wave 280 to ECU 220, which serves as a carrier being modulated to carry data bits representing the computer program. ECU 220 has a receiving unit indicated by antenna 285.

Figure 1:
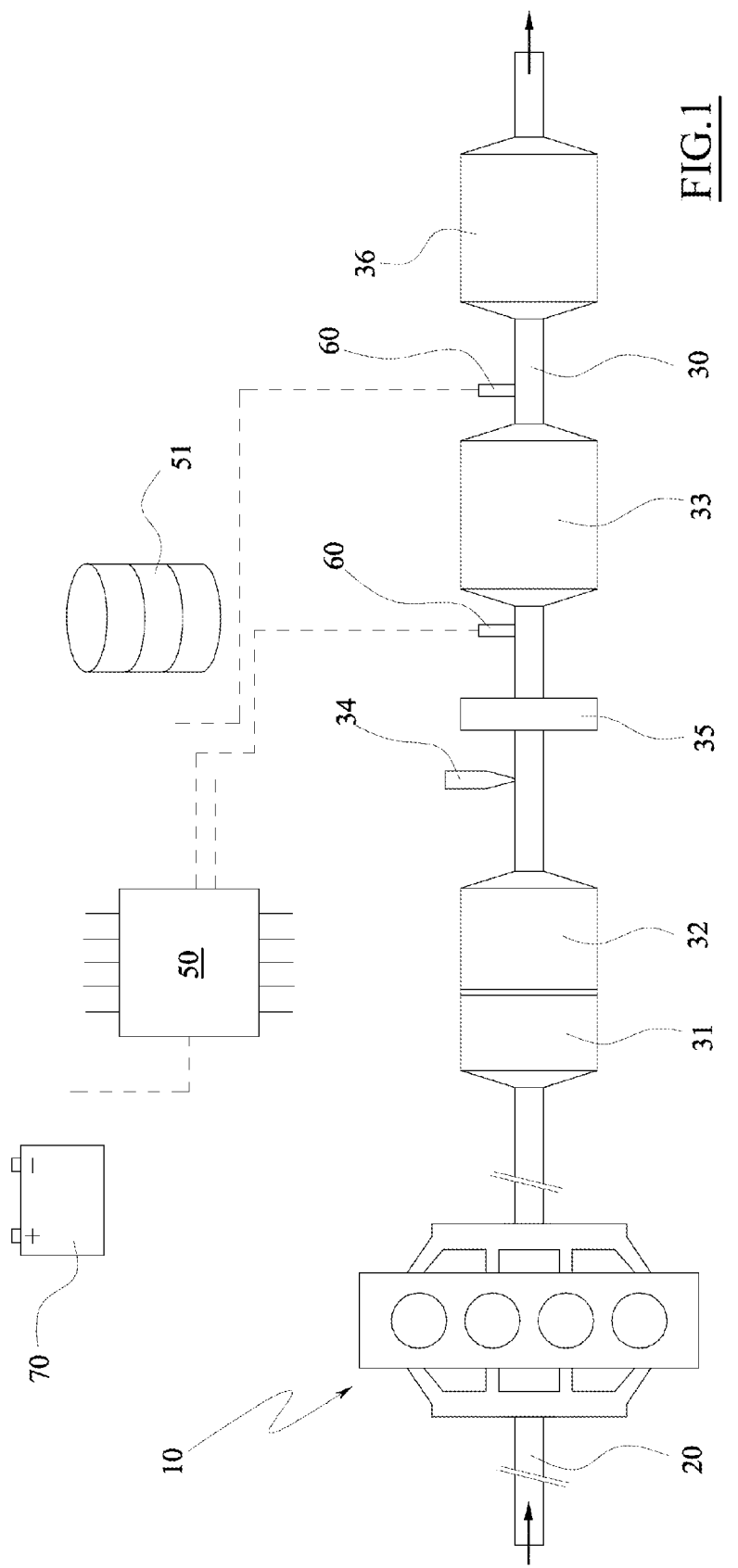
FIG. 1 is a schematic representation of an internal combustion engine.

Now reverting to FIG. 1, an embodiment is described with reference to an internal combustion engine 10 of a motor vehicle, in this case a Diesel engine. The internal combustion engine 10 is equipped with an intake line 20 for feeding fresh air into the engine cylinders, with an exhaust line 30 for discharging exhaust gas from the engine cylinders into the environment, and with a plurality of after treatment devices, which are located in the exhaust line 30, in order to degrade and/or remove pollutants from the exhaust gas.

In greater detail, the exhaust line 30 is provided with a Diesel Oxidation Catalyst (DOC) 31, for oxidizing hydrocarbon (HC) and carbon monoxides (CO) into carbon dioxide ($CO_2$) and water ($H_2O$); with a Diesel Particulate Filter (DPF) 32, which is located downstream the DOC 31, for removing diesel particulate matter or soot from the exhaust gas; and with an SCR catalyst 33, located downstream the DPF 32, for promoting the selective catalytic reduction (SCR) of the nitrogen oxides ($NO_x$) contained in the exhaust gas into diatomic nitrogen ($N_2$) and water ($H_2O$).

The SCR catalyst 33 is associated with a DEF injector 34, which is located in the exhaust line 30 between the DPF 32 and the SCR catalyst 33, for injecting a Diesel Exhaust Fluid (DEF), typically urea ($CH_4N_2O$), in the exhaust gas flow. Due to thermo-hydrolysis reactions occurring inside the exhaust line 30, the DEF is converted into a gaseous reducing agent, typically ammonia ($NH_3$), which is stored inside the SCR catalyst 33 so as to promote the $NO_x$ conversion reactions. A mixer 35 is located in the exhaust line 30 between the DEF injector 34 and the SCR catalyst 33, in order to improve the mixing of the DEF in the exhaust gas, and a conventional muffler 36 is located downstream the SCR catalyst 33.

The internal combustion engine 10 is further equipped with an Engine Control Unit (ECU) 50, which is generally provided for controlling the operation of the internal combustion engine 10 as well as of the after treatment devices 31-33, by executing dedicated computer programs which are stored in a data carrier 51. By way of example, the ECU 50 is configured for controlling the injection of DEF into the exhaust line 30. In order to control the injection of DEF, the ECU 50 is connected with two $NO_x$ sensors 60, including a first $NO_x$ sensor 60 located in the exhaust line 30 between the DPF 32 and the SCR catalyst 33, and a second $NO_x$ sensor 60 located in the exhaust line 30 downstream the SCR catalyst 33. These $NO_x$ sensors 60 are basically provided for measuring the concentration of nitrogen oxides ($NO_x$) in the exhaust gas that flows into the exhaust line 30, respectively upstream and downstream of the SCR catalyst 33.

Figure 2:
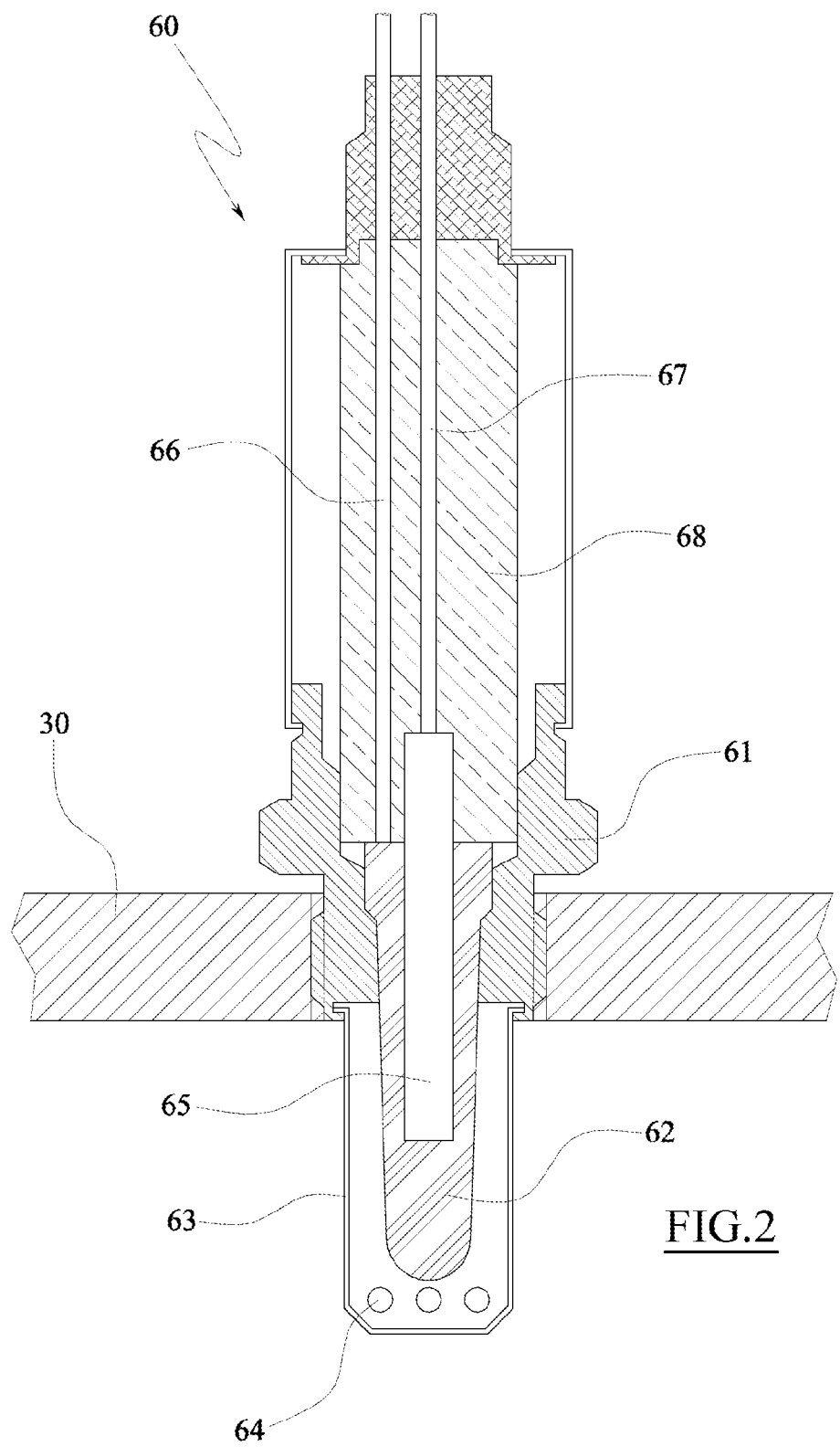
FIG. 2 schematically shows a longitudinal section of a conventional $NO_x$ sensor.

As shown in FIG. 2, each $NO_x$ sensor 60 comprises a support body 61 and a sensing element 62 (of the $NO_x$ concentration), which is joined to this support body 61. The support body 61 is screwed in a treated hole of the exhaust line 30, so that a portion of the sensing element 62 protrudes inside the exhaust line 30, thereby being directly subjected to the exhaust gas flow. This protruding portion of the sensing element 62 is protected by a cover 63, which is fixed to the support body 61 and which is provided with a plurality of holes 64 allowing the exhaust gas to reach the sensing element 62.

As explained in the preamble, the sensing element 62 guarantees an accurate and stable output signal only if it is heated to a target operating temperature (of about 800° C.) and if this operating temperature is kept constant during the operation of the $NO_x$ sensor 60. For this reason, the $NO_x$ sensor 60 further comprises a dedicated electrical heater 65, which is provided for heating the sensing element 62. In greater detail, the heater 65 is a resistor which is supplied with a pulse width modulation (PWM) electrical signal, and which is provided for converting this PWM electrical signal into a corresponding quantity of heat.

The amplitude of the PWM electrical signal depends on a voltage supplied by an electrical battery 70 that is connected to the $NO_x$ sensor 60 via the ECU 50. On the contrary, the duty cycle of the PWM electrical signal is properly regulated by the ECU 50. More precisely, the ECU 50 is configured for using feedback data coming from the $NO_x$ sensor 60 to determine the deviation between the target operating temperature and the actual temperature of the sensing element 62; for determining the quantity of heat necessary to compensate this deviation and to maintain the sensing element 62 at the target operating temperature; and for adjusting the duty cycle of the PWM electrical signal as a function of the determined quantity of heat to be supplied.

The sensing element 62 and the heater 65 are connected to the ECU 50 via respective electrical cables, 66 and 67, which are separated by an insulating material 68. In order to control the injection of DEF, the ECU 50 generally requires two temperature data, namely the temperature of the exhaust gas in the exhaust line 30 between the DPF 32 and the SCR catalyst 33, and the temperature of the exhaust gas in the exhaust line 30 downstream the SCR catalyst 33.

Figure 3:
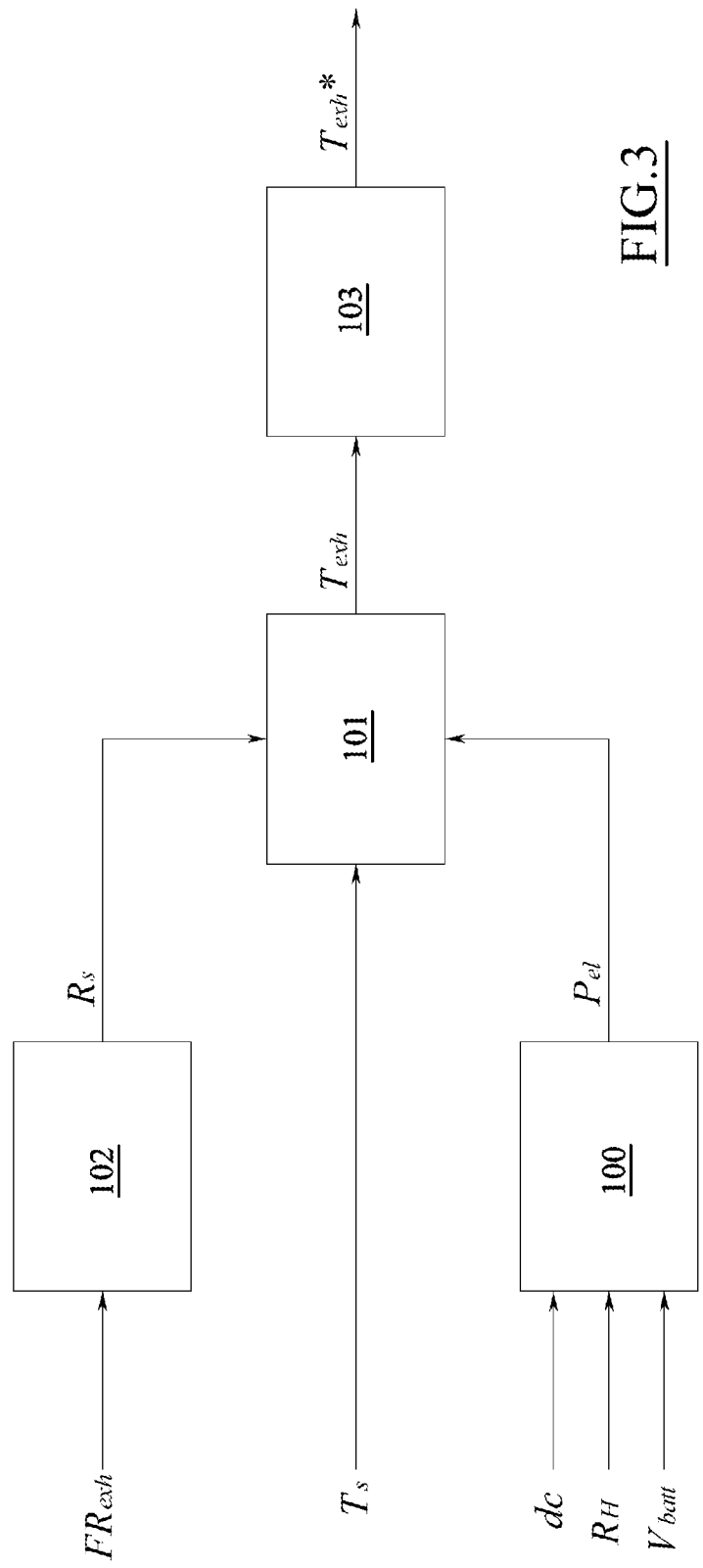
FIG. 3 is a flowchart representing a method for estimating the exhaust gas temperature according to an embodiment of the invention.

According to an embodiment, these temperature data are estimated by the ECU 50 using the above mentioned $NO_x$ sensors 60. More precisely, each $NO_x$ sensor 60 is used by the ECU 50 to estimate the temperature of the exhaust gas in a region of the exhaust line 30 close to the sensing element 62, according to the procedure illustrated in FIG. 3.

This procedure is based on the consideration that the sensing element 62 of the $NO_x$ sensor 60 is partially heated by the exhaust gas passing through the exhaust line 30, so that the quantity of heat supplied by the heater 65 serves only to complete the heating of the sensing element 62, thereby raising its temperature up to the target operating temperature.

Since the ECU 50 is configured for keeping the operating temperature constant, it follows that the quantity of heat supplied by the heater 65 during the operation of the $NO_x$ sensor 60 is about inversely proportional to the exhaust gas temperature. As a consequence, it is possible to estimate the temperature of the exhaust gas nearby the sensing element 62, by means of the determination of the quantity of heat supplied by the heater 65. According to this consideration, the estimating method illustrated in FIG. 3 firstly provides for determining a value of a parameter indicative of the heat released by the heater 65 of the $NO_x$ sensor 60, in this case a value $P_{e1}$ of an electrical power supplied by the ECU 50 to the heater 65. In particular, this value $P_{e1}$ is calculated by means of a first calculating module 100, according to the following equation:

$$P_{el} = dc \cdot \frac{V_{batt}^2}{R_H}$$

Where: dc is the duty cycle of the PWM electrical signal supplied to the heater 65 of the $NO_x$ sensor 60, $V_{batt}$ is the value of the voltage supplied by the electrical battery 70 connected to the heater 65 of the $NO_x$ sensor 60, and $R_H$ is the value of the electrical resistance of the heater 65 of the $NO_x$ sensor 60.

As explained above, the duty cycle dc of the PWM electrical signal is determined by the ECU 50, and it is conventionally defined according to the following equation:

$$dc = \frac{t}{\tau}$$

Where: $\tau$ is the period of the PWM electrical signal, and t is the portion of the period during which the amplitude of PWM electrical signal is maximum.

The value $V_{batt}$ of the voltage supplied by the electrical battery 70 is directly available for the ECU 50. The value $R_H$ of the electrical resistance of the heater 65 is a constant, which can be experimentally determined and stored in the data carrier 51 associated to the ECU 50. The calculated value $P_{e1}$ is then send to a second calculating module 101, which calculates a value $T_{exh}$ of the exhaust gas temperature according to the following equation:

$$T_{exh} = T_s - R_s \cdot P_{e1}$$

Where: $T_s$ is the value of the target operating temperature of the sensing element 62 of the $NO_x$ sensor 60, and $R_s$ is a value of a conversion parameter correlating the supplied electrical power to a temperature of the sensing element 62 of the $NO_x$ sensor 60. The value $T_s$ of the target operating temperature is a constant stored in the data carrier 51 associated to the ECU 50.

As explained in the preamble, the value $R_s$ of the conversion parameter generally depends on the flow rate of the exhaust gas in the exhaust line 30. Therefore, the value $R_s$ is determined by means of a third calculating module 102, which calculates the value $R_s$ as a function of a value $FR_{exh}$ of the exhaust gas flow rate. The value $FR_{exh}$ of the exhaust gas flow rate can be conventionally determined by the ECU 50, on the basis of the engine speed and of other engine operating parameters.

Notwithstanding the estimating method here disclosed the use of three calculating module 100, 101 and 102, any of these calculating modules can be eventually replaced by a predetermined map stored in the data carrier 51. The calculated value $T_{exh}$ is finally sent to a correcting module 103, which performs a dynamic correction of the calculated value $T_{exh}$, so as to achieve a corrected value $T_{exh}^*$ of the exhaust gas temperature to be considered as the final value of the estimation. This dynamic correction is provided for compensating the dynamic errors caused by the delay with which the exhaust gas heats the sensing element 62 of the $NO_x$ sensor 60, due to the thermal capacitance of the sensing element.

In greater detail, the dynamic correction can be performed by applying to the calculated value $T_{exh}$ an anticipative filter, such as for example a zero-pole filter. As a matter of fact, the transfer function of a zero-pole anticipative filter can be expressed by the following equation:

$$H = \frac{1 + \frac{s}{T}}{1 + \frac{s}{T_0}}$$

Where: s is an independent variable in Laplace transform format, T is a pulsation of the "zero" of the filter, $T_0$ is a pulsation of the "pole" of the filter, and $T < T_0$.

In view of the above description, it can be deduced that the means 292 for determining a value of a parameter indicative of a heat released by the heater 65 of the $NO_x$ sensor 60, and the means 294 for calculating a value of the temperature of the exhaust gas as a function of the determined value of this parameter can be chosen as the microprocessor 240, working in cooperation with random access memory 245 and computer readable medium 250.

As described above, another embodiment is a computer program with which the above method can be performed. The computer program comprises a program code for carrying out all the steps of the method, which is stored in the data carrier 51 associated to the ECU 50. In this way, when the ECU 50 executes the computer program, all the steps of the method described above are carried out.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A method for estimating a temperature of an exhaust gas in an exhaust line of an internal combustion engine, the exhaust line comprising a $NO_x$ sensor that comprises an heater, the method comprising:
   determining, with an electronic control unit (ECU), a value of a parameter indicative of an heat released by the heater of the $NO_x$ sensor; and
   calculating, with the electronic control unit (ECU), a value of the temperature of the exhaust gas as a function of the value of the parameter,
   wherein the parameter is an electrical power supplied to the heater of the NOx sensor, and wherein the value of the parameter is calculated according to:

$$P_{el} = dc \cdot \frac{V_{batt}^2}{R_H},$$

wherein, $P_{el}$ is the value of the electrical power supplied to the heater of the $NO_x$ sensor,
   wherein $V_{batt}$ is a value of a voltage supplied by an electrical battery connected to the heater of the $NO_x$ sensor,
   wherein dc is a duty cycle of a PWM electrical signal generated with the electrical battery and supplied to the heater of the $NO_x$ sensor, and
   wherein $R_H$ is a value of an electrical resistance of the heater of the $NO_x$ sensor.

2. The method according to claim 1, wherein the temperature of the exhaust gas is calculated according to:

$$T_{exh} = T_s - R_s \cdot P_{el},$$

wherein $T_{exh}$ is the value of the temperature of the exhaust gas,
   wherein $T_s$ is a value of a target operating temperature of the $NO_x$ sensor, and wherein $R_s$ is a value of a conversion parameter correlating the electrical power to the temperature of the $NO_x$ sensor.

3. The method according to claim 2, wherein $R_s$ is determined on a basis of a value of an exhaust gas flow rate in the exhaust line.

4. The method according to claim 1, further comprising performing a dynamic correction of the value of the temperature of the exhaust gas.

5. A non-transitory computer readable medium containing a computer program product with computer instructions stored therein for causing a computer processor to perform:
an estimation program for estimating a temperature of an exhaust gas in an exhaust line of an internal combustion engine, the exhaust line comprising a $NO_x$ sensor that comprises a heater program, the estimation program configured to:
  determine a value of a parameter indicative of an heat released by a heater of the $NO_x$ sensor; and
  calculate a value of the temperature of the exhaust gas as a function of the value of the parameter,
  wherein the parameter is an electrical power supplied to the heater of the NOx sensor, and wherein the value of the temperature of the exhaust gas is calculated according to:

$$T_{exh} = T_s - R_s \cdot P_{el},$$

wherein $T_{exh}$ is the value of the temperature of the exhaust gas,
wherein $P_{el}$ is the value of the electrical power supplied to the heater of the $NO_x$ sensor,
wherein $T_s$ is a value of a target operating temperature of the $NO_x$ sensor, and
wherein $R_s$ is a value of a conversion parameter correlating the electrical power to a temperature of the $NO_x$ sensor.

6. The non-transitory computer readable medium embodying the computer program product according to claim 5, wherein the value of the parameter is calculated according to:

$$P_{el} = dc \cdot \frac{V_{batt}^2}{R_H},$$

wherein $V_{batt}$ is a value of a voltage supplied by an electrical battery connected to the heater of the $NO_x$ sensor,
wherein dc is a duty cycle of a PWM electrical signal generated by with the electrical battery and supplied to the heater of the $NO_x$ sensor, and
wherein $R_H$ is a value of an electrical resistance of the heater of the $NO_x$ sensor.

7. The non-transitory computer readable medium embodying the computer program product according to claim 5, wherein $R_s$ is determined on a basis of a value of an exhaust gas flow rate in the exhaust line.

8. The non-transitory computer readable medium embodying the computer program product according to claim 5, the estimation program further configured to perform a dynamic correction of the value of the temperature of the exhaust gas.

9. An estimating apparatus for an internal combustion engine, comprising:
an exhaust line;
a $NO_x$ sensor;
a heater for the $NO_x$ sensor; and
  a controller configured to:
    determine a value of a parameter that is indicative of heat released by the heater of the NOx sensor, and
    calculate a value of the temperature of an exhaust gas in the exhaust line as a function of the value of the parameter,
wherein the parameter is an electrical power supplied to the heater of the NOx sensor, and wherein the value of the parameter is calculated according to:

$$P_{el} = dc \cdot \frac{V_{batt}^2}{R_H},$$

wherein, Pel is the value of the electrical power supplied to the heater of the $NO_x$ sensor,
wherein $V_{batt}$ is a value of a voltage supplied by an electrical battery connected to the heater of the $NO_x$ sensor,
wherein dc is a duty cycle of a PWM electrical signal generated with the electrical battery and supplied to the heater of the $NO_x$ sensor, and
wherein $R_H$ is a value of an electrical resistance of the heater of the $NO_x$ sensor.

10. The estimating apparatus according to claim 8, wherein the value of the temperature of the exhaust gas is calculated according to:

$$T_{exh} = T_s - R_s \cdot P_{el},$$

wherein $T_{exh}$ is the value of the temperature of the exhaust gas,
wherein $T_s$ is a value of a target operating temperature of the $NO_x$ sensor, and
wherein $R_s$ is a value of a conversion parameter correlating the electrical power to a temperature of the $NO_x$ sensor.

11. The estimating apparatus according to claim 10, wherein $R_s$ is determined on a basis of a value of an exhaust gas flow rate in the exhaust line.

12. The estimating apparatus according to claim 9, the estimating apparatus further configured to perform a dynamic correction of the value of the temperature of the exhaust gas.

* * * * *